United States Patent
Lewis

(10) Patent No.: US 10,466,343 B2
(45) Date of Patent: Nov. 5, 2019

(54) DUAL LASER RANGE FINDER

(71) Applicant: Garmin Switzerland GmbH, Schaffhausen (CH)

(72) Inventor: Robert A. Lewis, Bend, OR (US)

(73) Assignee: Garmin Switzerland GmbH (CH)

( * ) Notice: Subject to any disclaimer, the term of this patent is extended or adjusted under 35 U.S.C. 154(b) by 274 days.

(21) Appl. No.: 15/598,036

(22) Filed: May 17, 2017

(65) Prior Publication Data
US 2018/0335508 A1    Nov. 22, 2018

(51) Int. Cl.
| G06F 11/30 | (2006.01) |
| G01S 7/497 | (2006.01) |
| G01S 7/484 | (2006.01) |
| G01S 17/10 | (2006.01) |
| G01S 7/481 | (2006.01) |
| G01S 7/486 | (2006.01) |

(52) U.S. Cl.
CPC .............. *G01S 7/497* (2013.01); *G01S 7/484* (2013.01); *G01S 7/4815* (2013.01); *G01S 7/4868* (2013.01); *G01S 17/10* (2013.01)

(58) Field of Classification Search
CPC ...................................................... G01S 7/497
See application file for complete search history.

(56) References Cited

U.S. PATENT DOCUMENTS

| 5,046,839 A | 9/1991 | Krangle |
| 7,053,992 B2 * | 5/2006 | LaBelle ................... G01C 3/08  356/5.01 |
| 7,764,359 B2 | 7/2010 | Luo et al. |
| 7,777,866 B1 | 8/2010 | Kyrazis |
| 7,796,239 B2 | 9/2010 | Sawachi |
| 2007/0127009 A1 * | 6/2007 | Chen ....................... G01S 7/497  356/5.1 |
| 2008/0207357 A1 * | 8/2008 | Savarese ............ A63B 24/0021  473/407 |
| 2011/0221633 A1 | 9/2011 | Schramm et al. |

* cited by examiner

*Primary Examiner* — Phuong Huynh
(74) *Attorney, Agent, or Firm* — Samuel M. Korte; Max M. Ali

(57) ABSTRACT

Techniques are provided for implementing a system that can perform a range estimation of a target object at power levels both below and above an pre-defined power threshold. In embodiments, the system first performs a lower-power measurement, which may be sufficient to estimate the range to the object. If the low-power measurement is unsuccessful, the system then performs a fault check to ensure proper operation of the device. If the fault check is passed, the system may then perform a high-power measurement of the range to the object. Results may be provided to a user by a visual display.

20 Claims, 5 Drawing Sheets

DUAL LASER RANGE FINDER

BACKGROUND

Laser range finders are often operated at low power levels to comply with government regulations, such as those implemented by the U.S. government or European Union. A high-power measurement provides longer range and higher performance, but exceeds these defined power limits. Higher power may be used if a laser range finder system determines that doing so will not cause undesired consequences.

SUMMARY

Embodiments relate generally to laser based optical time-of-flight rangefinders. In particular, a first embodiment includes a system for calculating a range estimate comprising primary and secondary laser sources and at least one processor. The processor is operable to perform a first measurement using the primary laser at a first power level to attempt a first range estimate. If the first range estimate attempt is unsuccessful, the processor then performs a second measurement using the secondary laser to check for a fault condition. If the system is found to be in a fault condition, the process terminates. However, if the system is not found to be in a fault condition, the processor then performs a third measurement using the primary laser at a second power level, and outputs a calculated range estimate.

In a second embodiment, a system includes structures for calculating a range estimate to an object comprising primary and secondary laser sources and at least one processor. The processor is operable to perform a low-power measurement using the primary laser and detect the presence of an object. If an object is detected, a range estimate is calculated. If an object is not detected, the processor then performs a second measurement using the secondary laser to check for a fault condition. If the system is found to be in a fault condition, the process terminates. However, if the system is not found to be in a fault condition, the processor then performs a high-power measurement using the primary laser at a second power level, and outputs a calculated range estimate.

In a third embodiment, a system includes structures for calculating a range estimate comprising primary and secondary laser sources and at least one processor. The processor is operable to perform a low-power measurement using the primary laser and detect the presence of an object. If an object is detected, a range estimate is calculated. If an object is not detected, the processor then performs a second measurement using the secondary laser to check for a fault condition. If the system is found to be in a fault condition, the process terminates. However, if the system is not found to be in a fault condition, the processor then performs a high-power measurement using the primary laser at a second power level. The processor defines and monitors a hazard region during the high-power measurement, terminating the high-power measurement if an objects is detected entering the hazard region.

BRIEF DESCRIPTION OF THE DRAWING FIGURES

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

DETAILED DESCRIPTION

Overview

The following text sets forth a detailed description of numerous different embodiments. However, it should be understood that the detailed description is to be construed as exemplary only and does not describe every possible embodiment since describing every possible embodiment would be impractical. In light of the teachings and disclosures herein, numerous alternative embodiments may be implemented.

Embodiments are disclosed describing an optical time-of-flight rangefinding system. The rangefinding system includes two laser sources operable to generate a primary and secondary laser at first and second wavelengths, respectively. The system includes one or more processors operable to perform multiple rangefinding measurements and check for a fault condition of the system. Embodiments display the results of a rangefinding measurement or a fault condition to a user via a visible display.

Figure 1:
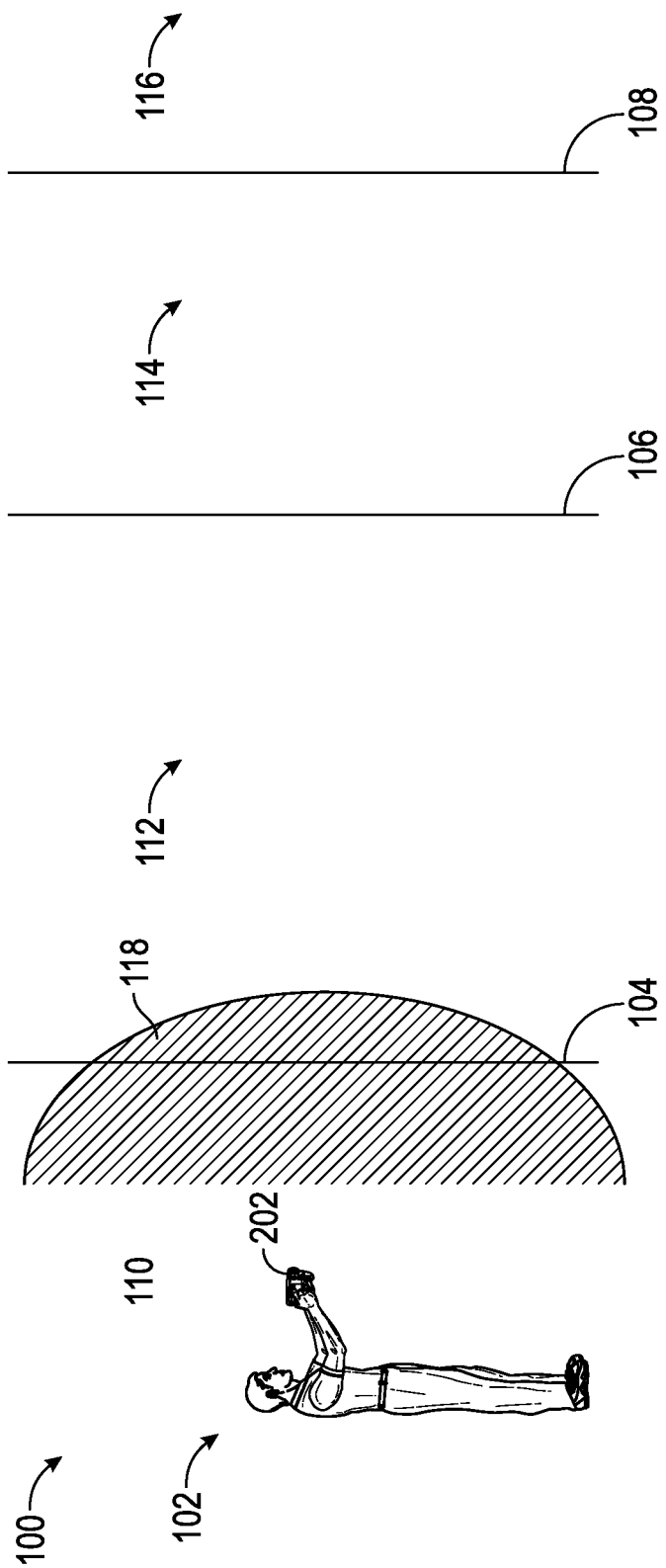
FIG. 1 illustrates an exemplary range finding situation in which embodiments of the system may be used.

Embodiments are disclosed describing an optical-based rangefinding system for use at various distances and power levels. As seen in FIG. 1, the system may include one or more electronic targeting devices 202 operated by a user 102 to determine the distance to and/or position of an object. The object may be, for example, a golf flagstick, distant mountain, game animal, or any other target of interest to which a user may seek to determine an estimate of its range. In embodiments, the "object" may merely be a point on the ground. As used in this description, the term "object" is intended to include any target subject to which a range may be estimated using an optical rangefinding system.

Embodiments of systems disclosed may include one or more processors operable to calculate a range estimate of an object by performing a rangefinding operation with one or more optical transmitters and at least one receiver. The optical transmitters are operable to transmit one or more pulses of a light beam towards a target. The rangefinding calculations performed by the processor(s) in embodiments may be based, at least in part, on time of flight data of the light beams produced by the laser sources. In embodiments, the laser sources produce laser beams at variable and adjustable power levels and burst rates with wavelengths distinct from one another.

The system may, in some embodiments, perform a series of measurements to generate a range estimate to an object. In embodiments, the primary laser is first used to perform a first low power measurement. Next, the secondary laser may be used to check for a fault condition of the system, such as a blockage of an aperture or a target within a pre-defined parallax limit. In embodiments, the primary laser may be then be used to perform a third measurement at a second, higher power level to attempt to estimate the range to the object. An estimated range or fault condition may be presented via a visual display. In embodiments, a region around the device may be monitored for objects such as humans entering the region, and a measurement may be terminated upon sensing an object.

Hardware

Figure 2:
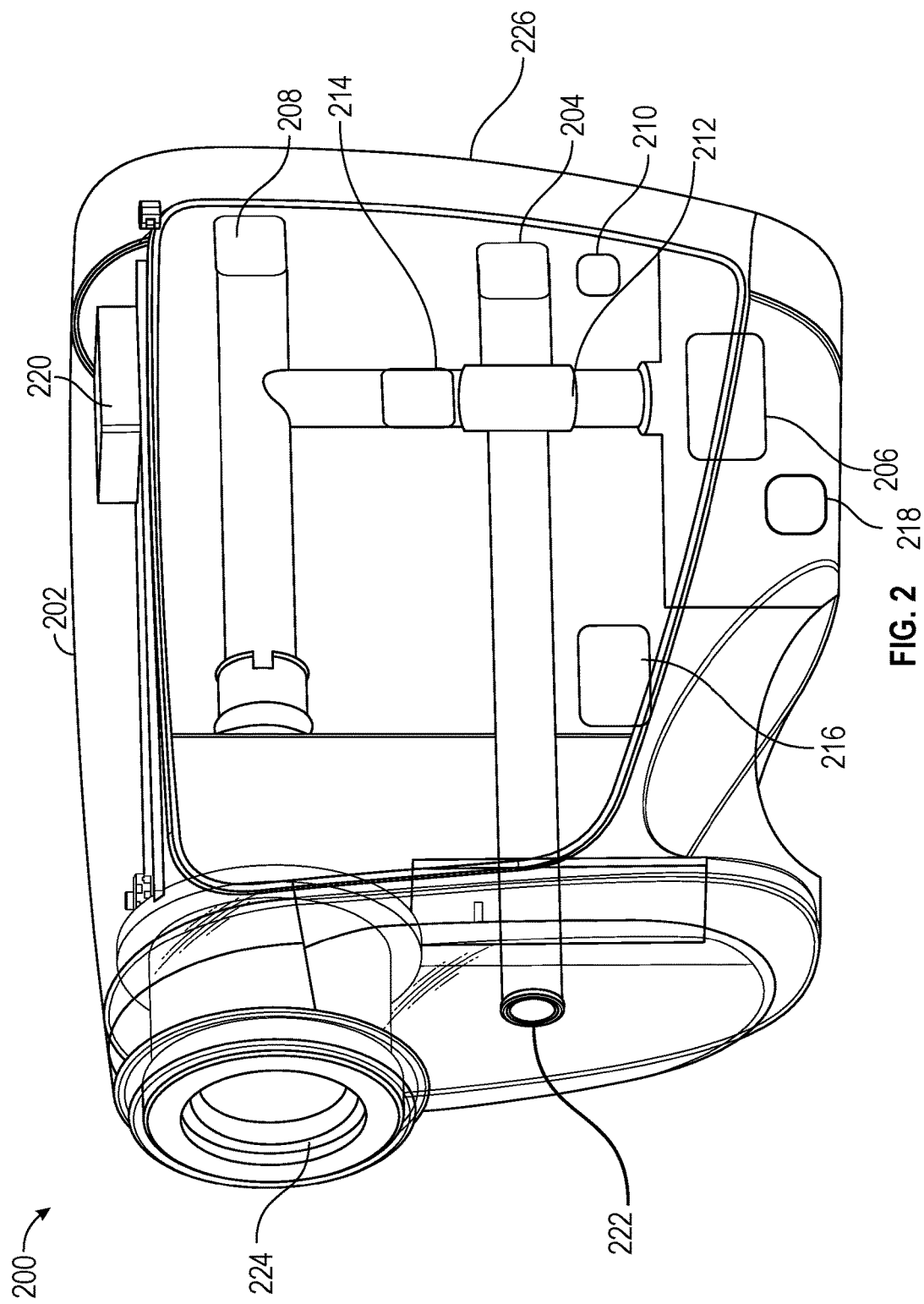
FIG. 2 is a schematic illustration of an exemplary range measurement system 200 in accordance with an embodiment of the disclosure.

FIG. 2 is an illustration of a block diagram of an exemplary rangefinding system 200 in accordance with an embodiment of the disclosure. FIG. 2 is only an example, provided for purposes of discussion, and should not be construed as limiting. Any of the components illustrated in FIG. 2 may be larger, smaller, repositioned, or omitted entirely in particular embodiments.

In some embodiments, targeting device 202 may act as a standalone electronic device and not require communications with external computing devices such as mobile device 250 or remote server 260. In other embodiments, which are further discussed below, targeting device 202 may communicate with and/or work in conjunction with one or more of external computing devices 250 and/or 260.

Device 202 may be configured to communicate with one or more mobile devices and/or one or more remote servers using any suitable number of communication networks and wired and/or wireless links (e.g., a mobile communication network, wired and/or wireless links) in conjunction with any suitable number and type of communication protocols.

In an embodiment, one or more of mobile devices and/or remote servers may include any suitable number and/or type of computing devices configured to communicate with and/or exchange data with device 202. For example, one or more of mobile devices may be implemented as a handheld computing device (e.g., smartphone, tablet, laptop, netbook, notebook, pager, personal digital assistant (PDA), wearable computing device, smart glasses, a smart watch or a bracelet), or any other suitable type of computing device capable of wired and/or wireless communication, while one or more of remote servers may be implemented as one or more cloud data services, web servers, or databases.

In an embodiment, device 202 may communicate with one or more of mobile devices and/or remote servers to send data to and/or to receive data from mobile devices and/or remote servers. For example, device 202 may communicate with one or more remote servers to receive configuration data and/or to send data collected, measured, and/or generated by targeting device 202 to remote servers (e.g., range estimation data, fault condition data).

A communication network utilized may include any suitable number of nodes, or additional wired and/or wireless networks, in various embodiments. For example, in an embodiment, communication network 270 may be implemented with any suitable number of base stations, landline connections, internet service provider (ISP) backbone connections, satellite links, public switched telephone network (PSTN) connections, local area networks (LANs), metropolitan area networks (MANs), wide area networks (WANs), or any suitable combination of local and/or external network connections. To provide further examples, a communication network may include wired telephone and/or cable hardware, satellite, cellular phone communication networks. In various embodiments, the communication network may provide targeting device 202 with connectivity to network services, such as Internet services, for example.

A communication network may be configured to support communications between device 202 and a remote server in accordance with any suitable number and/or type of wired and/or wireless communication protocols. Examples of suitable communication protocols may include personal area network (PAN) communication protocols (e.g., BLUETOOTH), Wi-Fi communication protocols, radio frequency identification (RFID) and/or a near field communication (NFC) protocols, cellular communication protocols, or Internet communication protocols (e.g., Transmission Control Protocol (TCP) and Internet Protocol (IP)).

In another embodiment, device 202 need not communicate with one or more of mobile devices and/or a remote server. For example, device 202 may operate as a standalone rangefinding device that is carried and operated by a user to estimate a range to a selected target object. Device 202 may be implemented as any suitable type of portable and/or mobile electronic device configured to function as a rangefinding system. Device 202 may implement some of the functions described without implementing others.

As seen in FIG. 2, processor 210 may be implemented as any suitable type and/or number of processors, such as a host processor of targeting device 202, for example. To provide additional examples, processor 210 may be implemented as an application specific integrated circuit (ASIC), an embedded processor, a central processing unit (CPU) associated with targeting device 202, or a graphical processing unit (GPU). Processor(s) 218 may be configured to communicate with one or more of communications module 210, a memory unit 218, a visual display 226, first source 204, and second source 206, via one or more wired and/or wireless interconnections, such as any suitable number of data and/or address buses, for example. These interconnections are not shown in FIG. 2 for purposes of brevity. Device 202 may include a power source 220 such as a battery.

Processor 210 may be configured to operate in conjunction with one or more of communications module 216, a memory unit 218, a visual display 226, and receiver 208 to process and/or analyze data, to store data to memory unit 218, to retrieve data from memory unit 218, to display information on visual display 226, to receive, process, and/or interpret signals from receiver 208, to process user interactions via visual display 226, or to receive data from and/or send data to one or more of mobile devices and/or remote server.

In accordance with various embodiments, memory unit 218 may be a computer-readable non-transitory storage device that may include any suitable combination of volatile memory (e.g., a random access memory (RAM) or non-volatile memory (e.g., battery-backed RAM, FLASH). Memory unit 218 may be configured to store instructions executable on processor 218, such those describing the various techniques further discussed below, for example. These instructions may include machine-readable instructions that, when executed by processor 210, cause processor 210 to perform various acts as described herein. Memory unit 218 may also be configured to store any other suitable data used in conjunction with device 202, such as data received from one or more of mobile devices and/or remote server via communications module 216, signals from receiver 208 and information processed by processor 210, or data indicative of target objects.

Memory unit 218 may include a first portion implemented as integrated, non-removable memory and a second portion implemented as a removable storage device, such as a removable memory card. For example, memory unit 210 may include a SD card that is removable from device 202 and a flash memory that is not removable from device 202. Data may be transferred from a first portion of memory unit 218 to a second portion of memory unit 218, thereby allowing a user to remove a portion of memory unit 218 to access viewing data stored thereon on another device.

In an embodiment, targeting device 202 may include at least a first source 204 operable to generate a primary laser and a second source 206 operable to generate a secondary laser. In embodiments, the primary laser and secondary laser are generated at distinct wavelengths, which may be used to selectively permit or deny passage, as further discussed below. For example, the primary laser may be an infrared laser and the secondary laser may be a visible light laser. First source 204 and second source 206 may be multimode-pulsed laser diodes, in embodiments. This example is not intended to be limiting. Any wavelengths, visible or not, may be generated by the first source 204 and second source 206 provided as any suitable optical beam generation components.

In some embodiments, communications module 216 may be configured to utilize any suitable communications protocol to facilitate determining a geographic location of device 202. For example, communications module 210 may be configured to communicate with one or more satellites and/or wireless transmitters in accordance with a Global Navigation Satellite System (GNSS) protocol, to determine a geographic location of device 202, and to generate geographic location data. Wireless transmitters are not illustrated in FIG. 2, but may include, for example, one or more base stations implemented as part of a communication network.

For example, communications module 216 may be configured to utilize "Assisted Global Positioning System" (A-GPS), by receiving communications from a combination of base stations (that may be incorporated as part of a communication network) and/or one or more from satellites. Examples of suitable global positioning communications protocol may include Global Positioning System (GPS), the GLONASS system operated by the Russian government, the Galileo system operated by the European Union, or the BeiDou system operated by the Chinese government Additionally or alternatively, in embodiments communications module 216 may receive a geographic location of the system 200 from one or more mobile devices. Each or any of the mobile devices may be configured to utilize any suitable communications protocol to facilitate determining a geographic location, as described above. In a particular example, a mobile device may be a smart phone of the user 102 that determines the geographic location of the system via an integrated GPS receiver, and is operable to transmit that geographic location to the device 202 via communications module 216. This is intended only as example, and is not intended to be limiting. Any sort of location capturing technique performed through the use of communications module 216 is intended for inclusion within embodiments.

In embodiments, the primary laser is generated by the first source 204 at a power level that may be set and/or adjusted by processor 210. The power level may be static, such that the primary laser is always generated at a given power level, or may be dynamically adjusted by processor 210 to perform a particular measurement or function. Similarly, in embodiments, the secondary laser is generated by the second source 206 at a power level that may be set and/or adjusted by processor 210. The power level of the second source may be static, such that the secondary laser is always generated at a given power level, or may be dynamically adjusted by processor 210 to perform a particular measurement or function.

The power level of a laser is defined by at least a burst rate and a peak power level. Thus, for a particular measurement, the power level of the primary laser may be defined at least by a first burst rate and/or a first peak power level. Similarly, the power level of the secondary laser may be defined at least by a second burst rate and/or a second peak power level. As described below, either or both of the first and second burst rates and peak power levels may be set below or above a pre-defined threshold to perform a measurement, in embodiments.

Receiver 208 is operable, in embodiments, to receive reflections of the primary laser and secondary laser from objects, generate a signal representative of those reflections, and provide the signal to processor 210. An optical gate 214 is positioned between second source 206 and receiver 208, in embodiments, to direct a transmission of the secondary laser directly into receiver 208 to perform a reference calibration. The secondary laser may be permitted to selectively pass the optical gate 214 based on its wavelength by processor 210.

For example, a zero-distance reference calibration measurement can be performed by passing the secondary laser through a liquid crystal light valve functioning as optical gate 214 in an embodiment. The wavelength of light permitted to pass the gate 214 may be temporarily or permanently set by processor 210 to the wavelength of the secondary laser, preventing the primary laser (generated at a different wavelength) from reaching the receiver 208. This is only one example, and not meant to be limiting. In embodiments, reference measurements may be performed using the primary laser, secondary laser, or both.

As seen in FIG. 2, embodiments of device 202 include a first aperture 222 operable to emit the primary laser and the secondary laser and a second aperture 224. Each of the first and second apertures includes a lens for focusing and/or directing the lasers. The second aperture, in embodiments, is operable to receive reflections of the primary laser and secondary laser from objects in the device's field of view. The first aperture, as further described below, may also be operable to receive reflections of the secondary laser. Under such a construction, the first aperture 222 functions for both a transmission and reception of the secondary laser, allowing the device to check for a blockage of the second aperture 224 and search for objects within a parallax limit of system 200.

High performance, long distance rangefinders commonly incorporate narrow transmit beams to deliver the highest possible optical intensity to a given target. A narrow field of coverage transmit beam can result in issues stemming from parallax. Parallax results from the use of separate transmit and receive apertures, causing the apparent angle of the projected transmit spot, when viewed from the perspective receiver image plane, to move laterally with shortening distance. The moving image ultimately moves off the detector, causing signal drop off with decreasing range. A single aperture operable for both transmission and reception of a measurement beam would help circumvent the deleterious effect of parallax.

Optical switching element 212 shown in FIG. 2 is operable in embodiments to allow first aperture 222 to function as both a transmission and reception aperture for the secondary laser while preventing reflections of the primary laser from reaching receiver 208. In particular, the optical switching element 212 is operable to direct reflections of the secondary laser received by the first aperture to the receiver based on the secondary laser's wavelength, and prevents the reflections of the primary laser received by the first aperture from reaching the receiver based on the primary laser's wavelength. The optical switching element 212 may be constructed as a liquid crystal valve, and may be controlled by processor 210. In some embodiments, optical switching element 212 and optical gate 214 may be provided by a single component operable within device 202 to selectively allow the wavelength of the secondary laser to pass to the receiver 208. Alternatively, optical switching element 212 and optical gate 214 may be separate elements. In embodiments, optical switching element 214 may comprise one or more bifurcated mirrors. Additionally or alternatively, optical switching element 214 may comprise one or more polarization beam splitters.

FIG. 2 shows a perspective view of an example targeting device 202 that may be included in embodiments. The embodiment of FIG. 2 is intended for example only, and is not intended to be limiting. The device 202 may be alternatively embodied as a digital camera, incorporated into a handheld communication device such as a phone, or may be shaped as any other form and/or included as part of any other electronic device. In the embodiment shown in FIG. 2, a plurality of lenses 222, 224 are provided for targeting a target, projecting one or more lasers, receiving reflections of the one or more lasers, and estimating a range to the target. Measurements may further or alternatively be used to indicate a fault condition of device 202. In some embodiments, any of these functions may be performed by separate lens assemblies, while in other embodiments some of these functions may be omitted altogether. A visual display 226 may be provided at the rear of the device 202 illustrated in FIG. 2 for user input, information output, and/or targeting.

Visual display 226 may be implemented as any suitable type of display configured to facilitate user interaction, such as a capacitive touch screen display or a resistive touch screen display. In various aspects, visual display 226 may be configured to work in conjunction with other user controls and/or processor 210 to detect user inputs upon a user selecting a displayed interactive icon or other graphic, or to identify user selections of objects displayed via visual display 226. In alternative embodiments, visual display 226 is not configured to accept user interaction, and is merely used as a visual output device. In such cases, user control of the device may be achieved, for example, using user controls and or controlled remotely from a mobile device. Visual display 226 may provide user 102 with a visual representation of an estimated range to an object, such as a calculated distance or point on a map. As described below, in embodiments visual display 226 is operable to output a fault condition sensed by a measurement performed by the device, such as an aperture blockage.

As further discussed below, a user interface may be shown on display 216 to facilitate user interaction with device 202 and/or to provide feedback to a user. In an embodiment, a user may interact with the user interface of visual display 226 to change various modes of operation, to initiate certain functions, to modify settings, or to set options. For example, a user interface may include a user-input device such as an interactive portion of visual display 226 (e.g., a "soft" keyboard, buttons) displayed on visual display 226 and/or physical buttons integrated as part of user controls of device 202 that may have dedicated and/or multi-purpose functionality. To provide another example, user interface may cause visual alerts or icons to be displayed via visual display 226 and/or audible alerts to be sounded. Audible alerts may be sounded using any suitable device, such as a buzzer or speaker, which are not shown in FIG. 2 for purposes of brevity.

Example Procedures

In embodiments, memory unit 218 includes instructions that, when executed by processor 210, cause processor 210 to perform on or more measurements to determine a range estimate to an object. In the discussion below, the device 202 will be exemplified as a handheld electronic device carried by user 102 and the target will be exemplified as a tree in an open field, but this is not intended to be limiting. Embodiments may be utilized by any user 102 to perform rangefinding estimations to any object using one or more measurements. Embodiments of device 202 may be in any form, shape, or size, and may be integrated into the electronic systems and/or physical structure of a vehicle.

Returning to FIG. 1, a user 102 stands at one end of an open field 100 holding device 202 to perform a range estimation of an object, such as a tree. The field is divided into a plurality of zones 110, 112, 114, 116 as defined by boundaries 104, 106, 108. Device 202 is configured to perform a plurality of technique using at least two distinct laser sources operating at adjustable power levels. Based on which zone 110, 112, 114, 116 a target object is located in relative to the position of the user 102 and device 202, a different one of the plurality of techniques may be best performed to successfully and accurately estimate the range to the object. Further, higher power levels of transmitted lasers may present a greater risk to any person or animal that may be in the field 100 before device 202. Embodiments of the system may perform measurements in an order of increasing power level, to attempt a range estimation with the lowest risk first.

Embodiments may further perform techniques to check for a fault condition of system 200, such as a blockage of second aperture 224 or a position of an object before a parallax limit 104 of device 202, as further described below. Embodiments may perform one or more fault condition measurements before any range estimation measurement is performed. Additionally or alternatively, embodiments may perform one or more fault condition measurements between the performances of a plurality of range estimation measurements. For example, a fault measurement to check for a object positioned in zone 110 before parallax limit 104 may be performed using the secondary laser generated by second source 206 before using the primary laser from first source 204 to perform a range estimation. In other embodiments, a fault condition may arise from an issue with receiver 208 and/or processor 210. Additionally or alternatively, a fault measurement to check for a object positioned in zone 110 before parallax limit 104 may be performed after a first range estimation measurement using the primary laser at a low power, but before a second range estimation measurement using the primary laser at a high power. Embodiments employing this technique perform a low power first measurement, and upon an unsuccessful attempt to calculate a range estimate to an object, check for an object too close to device 202 to be detected by the first measurement. Upon finding no such object within zone 110, processor 110 may then perform a second high power measurement to estimate the range to a more distant object.

As seen in FIG. 1, low power boundary 108 represents the maximum distance from device 202 that the range to an object may be estimated using the primary laser generated at a low power level. This boundary 108 may be, for example, up to several hundred meters out from the device 202. The minimum boundary of a measurement performed using the primary laser transmitted from first aperture 222 and received by second aperture 224 is the parallax limit 104, since reflections objects closer than this distance may be missed due to a field of coverage and field of view mismatch. Thus, the range to any object located within zone 114, stretching from parallax limit 104 to this low power boundary 108, may be estimated using the primary laser generated at a low power level. As discussed above, the power level of a laser is defined by at least a burst rate and a peak power level. Thus, for a first, low power measurement, the peak power level of the primary laser may be set below a pre-defined peak power level and/or the burst rate of the primary laser may be set below a pre-defined burst rate. These pre-defined peak power level and/or pre-defined burst rate define a pre-defined power level threshold.

Objects located beyond low power boundary 108, in long range zone 116, would require a measurement using the primary laser at a high power level to estimate their range from device 202. The high power level would have a peak power level and/or burst rate beyond the pre-defined peak power level and pre-defined burst rate defining the pre-defined power level. In embodiments, the pre-defined peak power level and/or pre-defined burst rate are retrieved from storage in memory unit 218 by processor 210 to control first source 204 to generate the primary laser at a low power, below the pre-defined power level, or at a high level, above the pre-defined power level.

The pre-defined peak power level and/or pre-defined burst rate defining the pre-defined power level threshold may, for example, correspond to government-issued laser power level regulations. Alternatively, in embodiments the pre-defined power level threshold may be set at a level intended to conserve power. In such an embodiment, a first measurement is performed at a low power level to attempt a range estimation using as little energy as possible. If the range estimation attempt is unsuccessful, the processor 210 may then commit the energy required to perform a second measurement at higher power.

Figure 3:
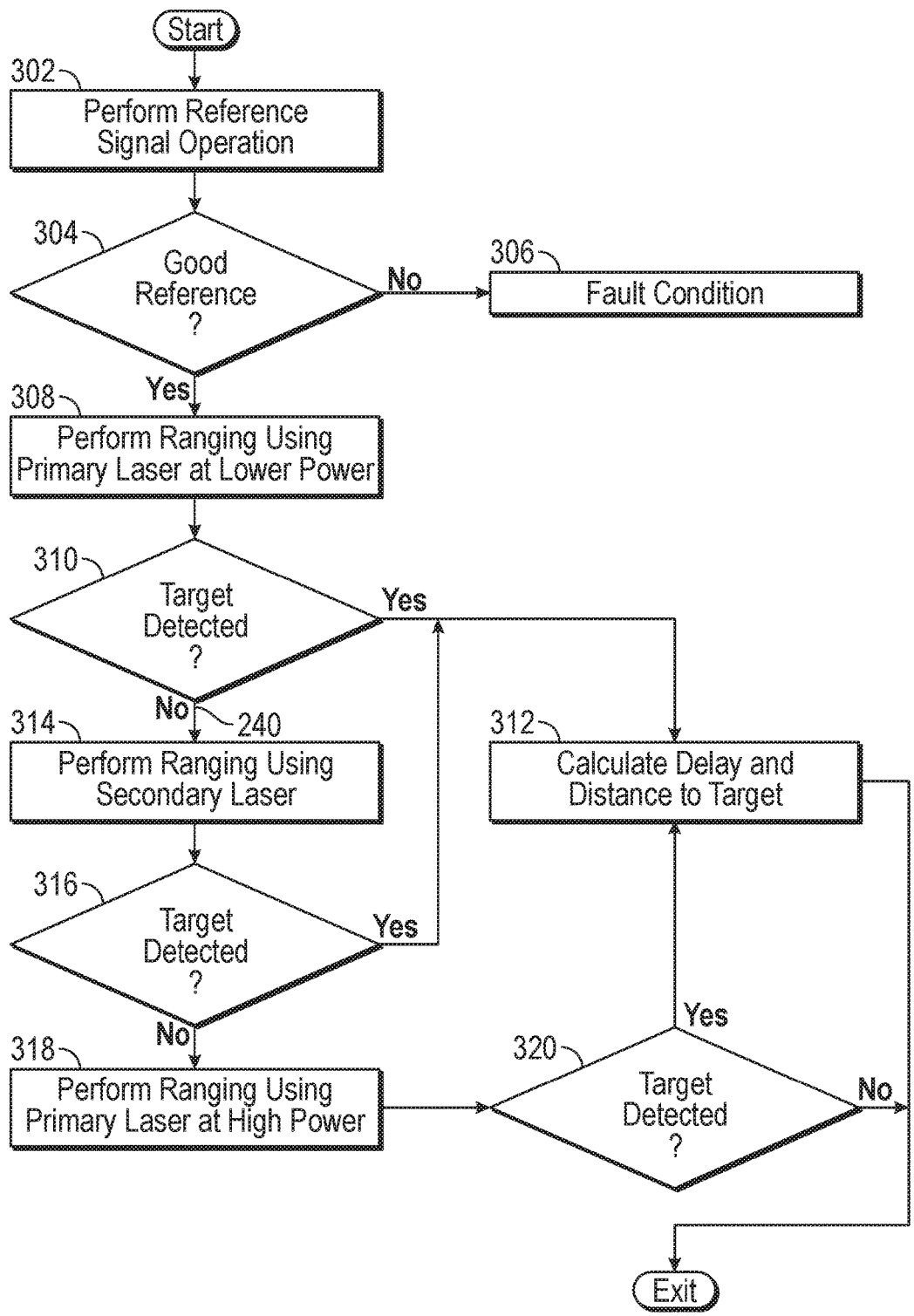
FIG. 3 is an illustration of a first method flow 300, according to an embodiment.

One exemplary method 300 of accounting for reflections from unintended targets is illustrated in FIG. 3. In an embodiment, method 300 may be performed by any suitable combination of one or more processors, applications, algorithms, and/or routines, such as processor 210 executing instructions stored in one or more memory units 218, for example, as discussed above for FIG. 2. Further in accordance with such an embodiment, method 300 may be performed by one or more processors working in conjunction with one or more components within a mobile device, such as one or more processors 210 working in conjunction with one or more of communications module 216, mobile device(s), or remote servers. The steps of method 300 may be performed in any reasonable order. Method 300 is only one example of an embodiment and is not intended to be limiting.

Method 300 begins at step 302, in which processor 210 performs a reference signal operation to prepare for a range estimation to an object. This may be a zero-distance reference calibration performed by directly passing the secondary laser through optical gate 214 to receiver 208, without need for transmission via first aperture 222. In some embodiments, this step may be omitted, but often such a zero-distance reference calibration is necessary to correct cumulative error sensed by receiver 208. In embodiments, step 302 may be performed several times, between or during measurements of the range to an object. Using the signal intensity and approximate time of arrival of this secondary laser signal, processor 210 can further use the reference signal operation step 302 to ensure that the receiver 208 is operating properly.

At step 304, processor 210 makes a check for a successful zeroing calibration, and if not terminates in a non-calibrated fault condition at step 306. At this or any other subsequent step in which a method terminates due to a fault condition, an alert of the fault condition and/or a description of a detected problem may be presented to user 102 via visual display 226. Additionally or alternatively, an alert of a fault condition may be sent to a mobile device or remote server via communications module 216.

If the reference calibration of step 304 is good, method 300 proceeds to step 308, wherein a first measurement is performed using the primary laser operating at a first, lower power level. As discussed above, this power level may be a pre-defined power level stored in memory corresponding to a government or corporate issued regulation. At step 310, a determination is made by processor 210 as to whether or not an object has been detected within the actionable range of the primary laser operating at the lower power limit, zone 114. If a reflected signal of the primary beam is received by receiver 208, indicating an object within zone 114, the method may proceed to step 312 in which optical time-of-flight information and the measured delay between beam generation and reception can be used by processor 210 to calculate a range estimate to the target. This range estimate may then be presented to user 102 via visual display 226 and/or a display on a mobile device. In some embodiments, the successful calculation of this first range estimate may constitute a target detection. A successful range estimation is an range estimation that calculates a valid distance to a target object, which may be compared to a value stored in memory unit 218 in embodiments.

If, however, a return signal from the first low power measurement is not detected indicating the non-presence of an object, method 300 proceeds to step 314 in which processor 210 causes second source 206 to generate a secondary laser to perform a second measurement. In embodiments, the secondary laser is a visible light laser, with a measurable range that is less than that of the primary laser due to a low signal to noise ratio from ambient light. As seen in FIG. 1, the limit of the measurable range of the secondary laser is boundary 106, meaning only objects within zone 112 will be detected. As discussed above, in embodiments, reflections of the secondary laser by target objects may be received by first aperture 222, the same aperture used to transmit the secondary laser. Using this single aperture construction circumvents the field of coverage/field of view mismatch issue for objects closer to device 202 than parallax limit 104. Thus, zone 112 measurable by the secondary laser transmitted and received by first aperture 222 stretches from device 202 to boundary 106. Boundary 106 may be, for example, approximately one hundred meters from device 202. If an object is detected within zone 112 during the secondary measurement, method 300 may progress to step 312 described above for calculating a delay and distance to the target object.

If no object is found within this region, processor may then perform a third measurement using the primary laser generated at a high power level to look for an object out to the maximum range of the device, as indicated by zone 116. As discussed above, this high power measurement may be above a pre-defined peak power level or burst rate stored in memory unit 218. Having checked overlapping zones 114 and 112 for objects in the first and second measurements, respectively, use of a high power primary laser beyond the pre-defined power limit can be performed with lesser risk. Again, upon a successful detection of an object at step 320, method 300 may proceed to step 312 described above for calculating a delay and distance to the target object. If no object is detected by this third, high power measurement, the method 300 may terminate without estimating a range. In some embodiments, an alert of a failure to detect an object may be presented to the user 102 via visual display 226.

Figure 4:
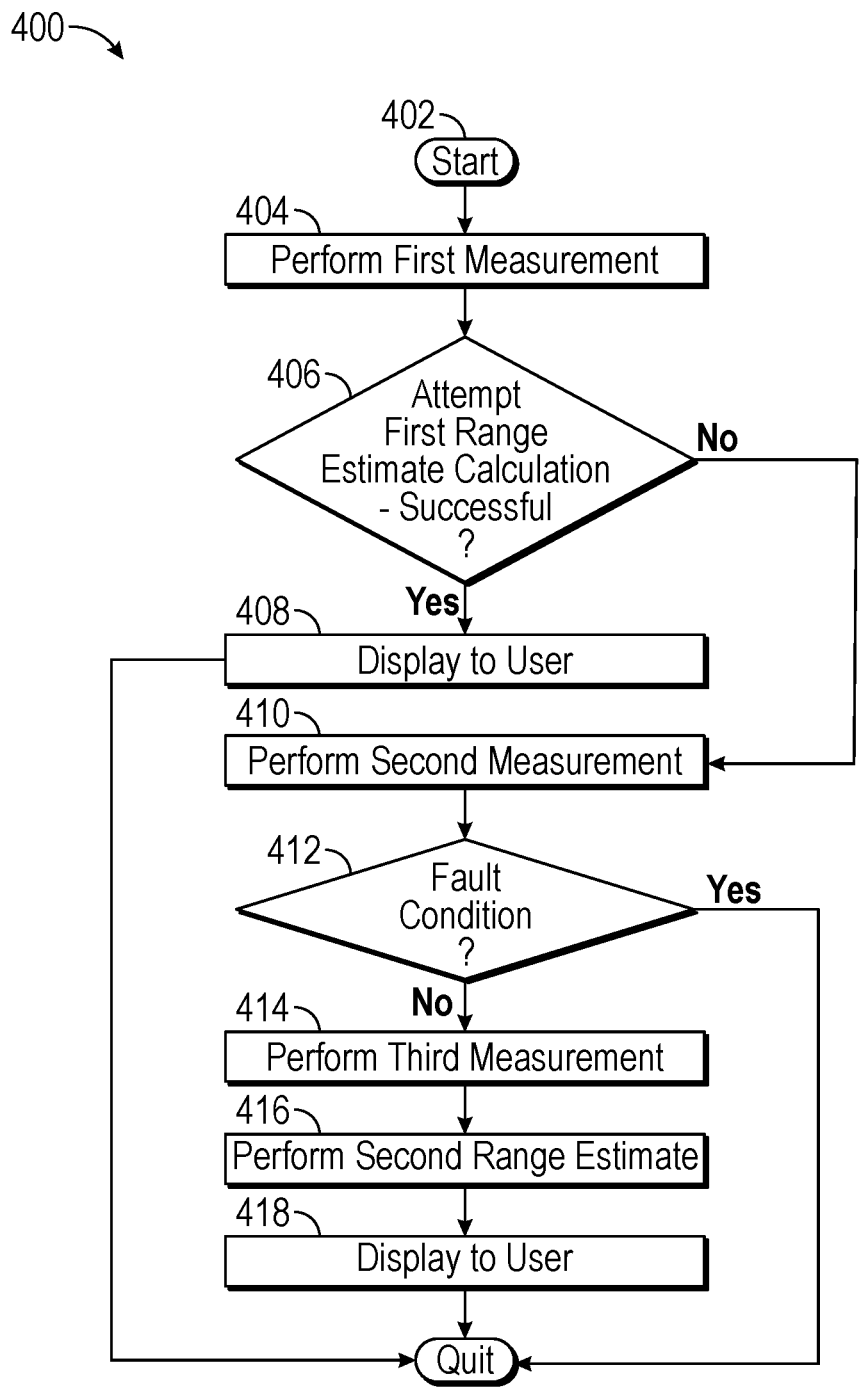
FIG. 4 is an illustration of a second method flow 400, according to an embodiment.

In some embodiments, the second measurement performed using the secondary laser may constitute a fault-check measurement, as illustrated by method 400 of FIG. 4. Method 400 may be performed by any suitable combination of one or more processors, applications, algorithms, and/or routines, such as processor 210 executing instructions stored in one or more memory units 218, for example, as discussed above for FIG. 2.

Method 400 begins at step 402, at which an indication to begin a measurement is received by processor 210. The indication to begin may come from a user's 102 operation of controls on device 102 such as a trigger or a soft-button on visual display 226, the expiration of a timer, or a remote activation from a mobile device or remote server. Once an indication to begin is received by processor 210, a first low power measurement is performed using the primary laser at step 404. At step 406, a first range estimate calculation is performed based on received signals of the primary laser. If the first range estimation is successful, the estimated range is displayed to user 102 via visual display 226 in step 408.

If the first range estimation is unsuccessful, method 400 continues to step 410, in which a second measurement in performed using the secondary level at a power level that may be above or below the pre-determined threshold level, in embodiments. The second measurement may function in method 400 to identify either a fault condition or a no-fault condition of system 200. In embodiments, a fault condition may be indicative of a blockage of an aperture of device 202, such as second aperture 224. Such a blockage often occurs when a user 102 is holding the device 202 backwards, with second aperture 224 pressed against their eye, or has failed to remove a lens cap covering second aperture 224. The second measurement is capable of sensing a blockage of second aperture 224 because a range measurement of an object within zone 112 is successful using first aperture 222 as both a transmit and receive aperture, but no return signal of the secondary laser can be detected from second aperture 224. As discussed above, when first aperture 222 functions as both a transmit and receive aperture, the return signal of the secondary laser is directed to receiver 208 via optical switching element 212.

Additionally or alternatively, the second measurement of step 410 may be a fault check measurement that calculates the range to an object using the secondary laser, and the system 200 is determined to be in a fault condition in step 412 if the range to a reflecting object is less than a threshold distance. This threshold distance may be, for instance, the parallax limit 104 of the device 202, or may be a very short distance (e.g. 1 cm) indicative of an object such as the user's hand blocking the first aperture 222. These threshold distances are merely examples and are not intended to be limiting. The threshold distance may be stored in memory unit 218 and compared with the calculated distance by processor 210 in step 412.

If any or all of the possible fault conditions described are present, processor 210 may terminate method 400 and display an alert of the fault condition to user 102 via visual display 226. The alert displayed may indicate a measured range and inform the user 102 that the measured range is less than the threshold distance. If no fault condition is measured by processor 210 using the secondary laser in the second measurement of step 410, the system 200 may be found to be in a no-fault condition in step 412 and proceed to performance of a third measurement in step 414.

The third measurement of step 414 is performed by processor 210 utilizing the primary laser generated at a second power level, which as discussed above may be above the pre-defined power level stored in memory unit 218. This high power measurement can detect reflections from objects anywhere in zone 116. In step 416, the reflections from the third measurement are used by processor 210 to perform a second range estimate calculation, which is displayed to user 102 via visual display 226 in step 418.

Measurements performed at power levels greater than the pre-defined power level may be hazardous to humans or other living things, especially in the case of eye damage. In embodiments of the system, processor 218 may define a region in field 100 as a hazard region 118, in which a human eye would be damaged by the high-power measurement. In embodiments, processor 210 may monitor the hazard region for an object during the high-power measurement, and terminate the high power measurement when an object is sensed entering the hazard region. The monitoring of the hazard region may be performed using the secondary laser generated by second source 206 and received by either first aperture 222 or second aperture 224.

Figure 5:
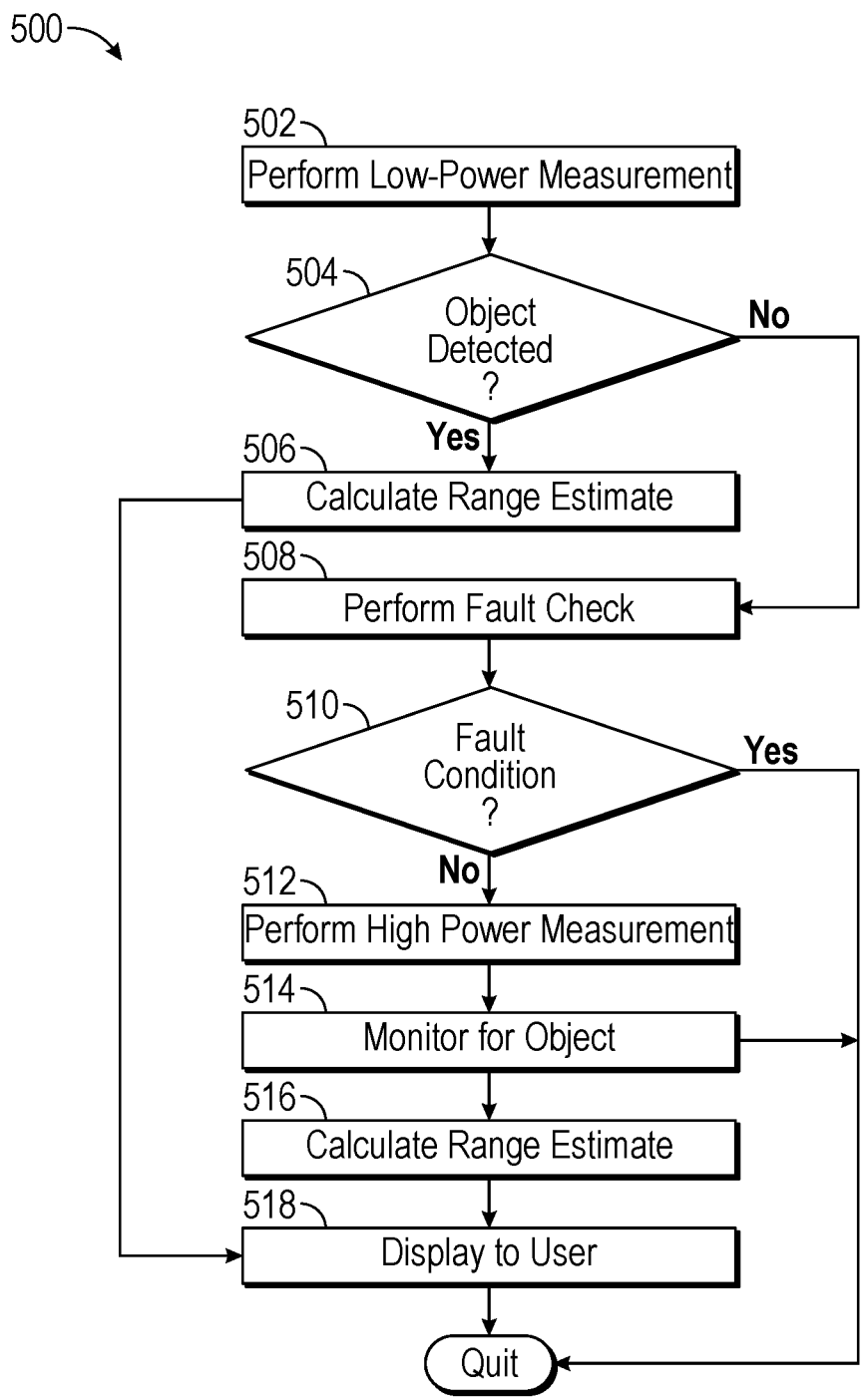
FIG. 5 is an illustration of a third method flow 500, according to an embodiment.

An embodiment illustrating this hazard region monitoring technique is illustrated in method 500 of FIG. 5. Method 500 may be performed by any suitable combination of one or more processors, applications, algorithms, and/or routines, such as processor 210 executing instructions stored in one or more memory units 218, for example, as discussed above for FIG. 2.

Method 500 begins at step 502, at which a low power measurement is performed using the primary laser by processor 210 as described above. If an object is detected in the low power measurement in step 504, method 500 proceeds to step 506 in which a range estimate is calculated by processor 210 based on time-of-flight data. This range estimate may be displayed to a user 102 via visual display 226 in step 518. If an object is not detected in the low power measurement in step 504, method 500 proceeds to step 508, in which a fault check measurement is performed as described above with respect to methods 300 and 400. As before, if a fault condition is determined in step 510, method 500 may display an alert to user 102 via visual display 226 and/or terminate. If a no-fault condition is determined in step 510, method 500 proceeds to step 512 in which a high power measurement is performed using the primary laser at a burst rate and/or peak power level that exceeds the pre-defined levels stored in memory unit 218.

At step 514, processor 210 determines a hazard region 118 for the high power measurement. As illustrated in FIG. 1, hazard region may pass boundaries 104, 106, 108 and include all or portions of any of zones 110, 112, 114, 116. Any portion or all of field 100 may be defined as being within hazard region 118 in embodiments. The hazard region illustrated in FIG. 1 is merely exemplary, and is not intended to be to scale relative to the user 102, device 202, field 100 or any of zones 110, 112, 114, 116. Hazard region 118 may be much larger or much smaller than that illustrated in FIG. 1. The hazard region may be a static distance from device 202 stored in memory unit 218 or may be dynamically determined by processor 210 based on parameters such as a geographic location of the system, time of day, orientation data from components such as an inclinometer, accelerometer, or compass heading indicator, cartographic data stored in memory unit 218, and/or results of the first and second measurements.

In embodiments, processor 210 monitors the hazard region in step 512 using the secondary laser while the third measurement is being performed using the primary laser operated at high power. Alternatively, the primary laser may be used to simultaneously perform a high power measurement and monitor the hazard region 118 in step 512. If an object is detected entering the hazard region, method 500 may immediately terminate with or without displaying an alert to user 102 via visual display 226. Alternatively, if an object is detected entering the hazard region, processor 210 may immediately terminate the third measurement using the primary laser operated at high power, but calculate a range estimate to the detected object using the secondary laser or primary laser operated at lower power. The lower power measurement may be at the same power as the first measurement or at another power level. Any calculated range estimate is then presented to user 102 via visual display 226 at step 518.

It should be appreciated that, while examples in the above disclosure are directed mainly to the exemplified uses, some embodiments of the system may be employed for any field requiring range estimation of target objects. Embodiments may be used in any setting or field, such as hunting, aeronautics, sports, and navigation. Further, embodiments may be particularly applied to military applications to perform a lower-power and higher power estimation of the range to a target. The commercial field discussed is merely exemplary and should not be construed as limiting.

Although systems and methods for assisting a user with estimating the range to an object have been disclosed in terms of specific structural features and acts, it is to be understood that the appended claims are not to be limited to the specific features and acts described. Rather, the specific features and acts are disclosed as exemplary forms of implementing the claimed devices and techniques.

The invention claimed is:

1. A system for calculating a range estimate comprising:
a first source operable to generate a primary laser;
a second source operable to generate a secondary laser;
at least one processor operable to:
perform a first measurement,
wherein the first measurement utilizes the primary laser generated at a first power level;
attempt a first range estimate calculation based on the first measurement;
determine that the first range estimate calculation was not successful;
perform a second measurement using the secondary laser;
identify either a fault condition or a no-fault condition based on the second measurement;
determine that the second measurement indicates the fault condition;
terminate the calculating the range estimate based on the determination of the fault condition;
determine that the second measurement indicates the no-fault condition;
perform a third measurement based on the determination of the no-fault condition,
wherein the third measurement utilizes the primary laser generated at a second power level; and
perform a second range estimate calculation based on the third measurement.

2. The system of claim 1,
further including a visual display,
wherein the processor is operable to display the first and second range estimate calculations on the visual display.

3. The system of claim 1, further comprising a first aperture operable to emit the primary laser and the secondary laser.

4. The system of claim 3,
further comprising an optical switching element and a receiver,
wherein the optical switching element is operable to direct reflections of the secondary laser received by the first aperture to the receiver.

5. The system of claim 4,
wherein the primary laser has a first wavelength,
wherein the secondary laser has a second wavelength,
wherein the optical switching element directs reflections of the secondary laser received by the first aperture to the receiver based on the second wavelength.

6. The system of claim 5, wherein the optical switching element prevents the reflections of the primary laser received by the first aperture from reaching the receiver based on the first wavelength.

7. The system of claim 2, further comprising a second aperture operable to receive reflections of the primary laser.

8. The system of claim 1, wherein the primary laser is an infrared laser and the secondary laser is a visible light laser.

9. The system of claim 1,
wherein the first power level is defined by a first burst rate and a first peak power level, and
wherein the second power level is defined by a second burst rate and a second peak power level.

10. The system of claim 9, wherein the first peak power level is below a pre-defined peak power level and the second peak power level is above the pre-defined peak power level.

11. The system of claim 9, wherein the first burst rate is below a pre-defined burst rate and the second burst rate is above the pre-defined burst rate.

12. The system of claim 1, further comprising an optical gate operable to direct the secondary laser into a receiver to perform a reference calibration.

13. A system for calculating a range estimate comprising:
a first source operable to generate a primary laser;
a second source operable to generate a secondary laser;
at least one processor operable to:
perform a low-power measurement using the primary laser;
determine a non-presence of an object from the low-power measurement;
perform a fault check measurement using the secondary laser;
determine a no-fault condition of the system based on the fault check measurement;
perform a high-power measurement using the primary laser based on the no-fault condition; and
calculate a range estimate to the object based on the high-power measurement.

14. The system of claim 13, wherein the processor is further operable to present an alert of the fault check measurement.

15. The system of claim 13,
wherein the step of performing the fault check measurement is performed by calculating a range to an object using the secondary laser, and
wherein the system is determined to be in the fault condition when the range to the object calculated using the secondary laser is less than a threshold distance.

16. The system of claim 15, wherein the threshold distance is a parallax limit of the system.

17. The system of claim 13, wherein the fault condition is indicative of a blockage of an aperture of the system.

18. A system for calculating a range estimate comprising:
a first source operable to generate a primary laser;
a second source operable to generate a secondary laser;
at least one processor operable to:
- perform a low-power measurement using the primary laser;
- determine a non-presence of an object from the low-power measurement;
- perform a fault check measurement using the secondary laser;
- determine a no-fault condition of the system based on the fault check measurement;
- perform a high-power measurement using the primary laser based on the no-fault condition;
- define a hazard region for the high-power measurement;
- monitor the hazard region for an object during the high-power measurement; and
- terminate the high-power measurement when an object enters the hazard region.

19. The system of claim 18, wherein the step of monitoring the hazard region for the object is performed using the secondary laser.

20. The system of claim 18, wherein the hazard region is defined as a region in which a human eye would be damaged by the high-power measurement.

* * * * *